United States Patent Office 2,772,192
Patented Nov. 27, 1956

2,772,192

SOLDERING FLUX

Delbert E. Wobbe, Maywood, and Fred J. Stasewich, Chicago, Ill., assignors to American Can Company, New York, N. Y., a corporation of New Jersey No Drawing. Application March 14, 1952, Serial No. 276,702

4 Claims. (Cl. 148—23)

This invention relates to a novel and improved soldering flux and more particularly refers to a flux comprising ammonium chloride, urea, monoethanol amine and hydrochloric acid dissolved in a solvent comprising a major amount of a volatile alcohol and a minor amount of water.

An object of the invention is the provision of a solder flux which makes possible rapid soldering of iron surfaces.

Another object is the provision of a soldering flux which is not readily charred by a relatively high melting solder and which maintains its fluxing ability for a length of time that is sufficient to aid molten solder to fill small crevices by capillary action, and the provision of a method of compounding such soldering flux.

Numerous other objects and advantages of the invention will be apparent as it is better understood from the following description which is of a preferred embodiment thereof.

In the manufacture of sheet metal containers having a side seam, it is the usual practice to bond and seal such seam by means of a weld, by solder or by use of an organic adhesive in order to make the container body hermetic. The most common method of making a leak-proof or hermetic side seam is to use solder for bonding of sealing purposes. This step in the can manufacturing process is relatively simple if the sheet metal is tin plate and the solder contains a fairly high proportion of tin, because of the ease with which tin will alloy itself with or become wetted by other metals. A much more difficult situation is presented when the sheet metal is plain steel or iron devoid of a coating of tin. Iron does not form alloys readily with most metals at solder applying temperatures. Generally, a sheet of iron has a thin layer of oxide on its surface which must be reduced before a solder will adhere to the plate. If a tin-free solder is employed, the difficulties of soldering sheet steel are increased considerably. Tin-free solders ordinarily have a high melting or application temperature, they do not wet steel readily, and alloy only very slightly and slowly with the sheet. Thus, the flux must serve the important functions of rapidly deoxidizing the area to be soldered, and of reducing the surface tension of the solder and cause it to wet the plate, so that it will flow into narrow spaces between layers of metal by capillarity. These functions must be effected at temperatures as high as 700° F. or even higher, without charring of the organic materials in the flux.

We discovered that if we use proper proportions of ammonium chloride, urea, monoethanol amine and hydrochloric acid, all dissolved in a low molecular weight, volatile alcohol and a small amount of water it is possible to solder the seams of steel, chemically treated steel or black iron containers with a tin-free solder at the rate of about 250–400 per minute. On inspection of tin-free containers soldered with the use of our new flux, we found that a continuous band or layer of solder is deposited between the layers of metal constituting the side seam, with very little evidence of "islands" or unsoldered areas.

The preferred flux examplary of my invention has the following composition:

| Ingredient: | | Amount |
|---|---|---|
| Ammonium chloride | grams | 100 |
| Urea | do | 400 |
| Monoethanol amine | do | [1]151.2 |
| Hydrochloric acid (concentrated) 37% HCl by wt | grams | [2]750.5 |
| Water | ml | 125 |
| Isopropyl alcohol, sufficient to make 1 gallon of flux (about 2883 ml.). | | |

[1] 147 ml.
[2] 632 ml.

The total water content in this example is approximately 20% by weight of the finished flux. A small amount of water is necessary in order to dissolve the nitrogen containing compounds which have a very limited solubility in the alcohol, but it is desirable to keep the water concentration as low as possible and still maintain as high a concentration of the nitrogen compounds as is practical under operating conditions. Thus, the 100 grams of ammonium chloride per gallon of flux represents a solution of the salt that is near saturation. The solubilities of ethanol amine and urea hydrochlorides in alcohol are rather low, but in the presence of excess hydrochloric acid these acid salts become very soluble in the low boiling alcohol.

Other low molecular weight alcohols that are useful include methyl alcohol, ethyl alcohol and n-propyl alcohol, and mixtures of any of the monohydric alcohols having from one to three carbon atoms.

An example of a flux containing no added water has the following composition:

| Ingredient: | | Amount |
|---|---|---|
| Ammonium chloride | grams | 200 |
| Urea | do | 2500 |
| Monoethanol amine | ml | 500 |
| Hydrochloric acid (concentrated) | ml | 800 |
| Isopropyl alcohol, sufficient to make one gallon of flux. | | |

It is believed that the greatly improved results obtained from the use of my flux are due to the solvent action of molten urea hydrochloride on the ammonium chloride and monoethanol amine hydrochloride. During the soldering operation the water, alcohol and excess hydrochloric acid are vaporized, leaving the nitrogen salts of hydrochloric acid. Ammonium chloride is unstable when melted. The temperature of the container seam may not be quite high enough to melt the ammonium chloride, but it is sufficiently high to melt the urea hydrochloride, which then acts as a solvent for the ammonium and the monoethanol amine salts. This combination of liquid salts is very effective in preparing the plate for reception of solder and in reducing the surface tension of the molten alloy, so that the latter will form a strong hermetic seal in the seam of the container.

The useful range of each ingredient of my flux is tabulated below:

| Ingredient: | | Amount |
|---|---|---|
| Ammonium chloride | grams | 50–200 |
| Urea or hydochloride salt thereof | do | 200–2500 |
| Monoethanol amine or hydrochloride salt thereof | grams | 100–2500 |
| Hydrochloric acid (concentrated) 37% HCl by wt | ml | 500–800 |
| Added water | ml | 0–150 |
| Volatile alcohol, sufficient to make 1 gallon of flux. | | |

The flux must be strongly acid in reaction to deoxidize or reduce the plate preparatory to application of solder. Therefore, an amount of acid in excess of that required to neutralize the monoethanol amine and urea is necessary. Further, the acidity must be of such order as to preclude precipitation of iron salts formed by the reducing process.

In my various formulations, I prefer to keep the water concentration as low as possible and preferably never greater than 20 percent by weight of the flux. More heat is required to vaporize water than any other liquid component of the flux, and a large part of the caloric value utilized in water vaporization is supplied by the molten solder. As a consequence, excessive amounts of water in the flux may cause too rapid solidification of a tin-free solder, or to avoid this, may require considerable after-heating of the solder to compensate for the calories yielded to the water.

If liquid ethanol amine is employed in the flux a practical maximum is about 500 ml. per gallon of finished flux. The amount of hydrochloric acid required to both neutralize this alkaline nitrogen compound and maintain an excess of acid may necessarily be increased. However, if anhydrous monoethanol amine hydrochloride salt is used in place of the liquid amine, the concentration of salt can be as high as 2500 grams per gallon of flux. When a high concentration of the monoethanol amine hydrochloride is used, it is preferable to incorporate the water in the flux through the use of concentrated hydrochloric acid. Because the hydrochloride salt is acid in reaction, the volume of acid required is proportionately lower than when the amine is used. Thus, 500 ml. of concentrated hydrochloric acid is sufficient to maintain the proper excess when 2500 grams of ethanol amine hydrochloride are used per gallon of flux.

Care must be exercised in preparing the flux in order to be assured of a uniformly reproducible composition. My preferred procedure is to combine the requisite amount of all the nitrogen containing salts and to acidify them without an excessive increase in temperature. This can best be done by adding a portion of the alcohol solvent to the salts before adding the concentrated hydrochloric acid. After the proper stage of acidification is reached, the remainder of the alcohol is added. For example, the specific formulation disclosed herein is best prepared by adding the 100 grams of ammonium chloride to 125 ml. of water. This amount of water is not quite sufficient to dissolve all of this salt, but it is sufficient to keep the ammonium chloride in solution in the final flux mixture. The urea and monoethanol amine, are then added to the water-ammonium chloride mixture. From ⅙ to ⅓ of the required alcohol (450-950 ml.) is then added to the nitrogenous ingredients. At this point sufficient concentrated hydrochloric acid is slowly added with stirring to neutralize the monoethanol amine and urea. About 232 ml. of HCl are required for this step for a gallon of finished flux. This reaction is exothermic and must be carried out in such a manner as to prevent overheating the solution. The alcohol in the mixture serves to absorb a considerable amount of the heat generated without vaporizing any appreciable amount of the components.

After neutralization, the excess hydrochloric acid, about 400 ml., is added with stirring. Finally, the remainder of the isopropyl or other volatile alcohol is added to make a volume of one gallon. It is important that all nitrogen containing ingredients are combined before neutralization and addition of excess acid. Otherwise these ingredients will not go into complete solution in the alcohol. If monoethanol amine hydrochloride is used in place of the alkaline amine, the nitrogenous materials are combined and a portion of the required alcohol is added. The hydrochloric acid is then added to the alcohol-salt mixtures. An excess of acid together with water introduced thereby should be sufficient to cause all the ingredients to go into solution. The remainder of the requisite alcohol is then added. It is preferable, however, to keep the water concentration no greater than 20% by weight of the finished flux.

It is thought that the invention and many of its attendant advantages will be understood from the foregoing description, and it will be apparent that various changes may be made in the matter of the ingredients, their identity and their proportions and in the methods of compounding without departing from the spirit and scope of the invention or sacrificing all of its material advantages, the form hereinbefore described being merely a preferred embodiment thereof.

We claim:

1. A method of preparing a liquid soldering flux containing ammonium chloride, urea, monoethanol amine and hydrochloric acid in solution in a mixture of a volatile alcohol and water in which the water content is not in excess of 20% by weight of the finished flux, comprising adding the nitrogen containing ingredients to a small amount of water insufficient to dissolve said ingredients, adding from ⅙ to ⅓ of the volatile alcohol, neutralizing the alkaline nitrogen containing ingredients by slow addition of hydrochloric acid, adding an excess of concentrated hydrochloric acid to make the solution strongly acidic and adding the remainder of the volatile alcohol.

2. A method of preparing a liquid soldering flux containing ammonium chloride, urea, monoethanol amine and hydrochloric acid in solution in a major proportion of isopropyl alcohol and a minor proportion of water in which the water content is not in excess of 20% by weight of the finished flux comprising adding the nitrogen containing ingredients to the entire volume of water used, adding from about ⅙ to about ⅓ of the isopropyl alcohol, neutralizing the alkaline nitrogen containing ingredients with approximately a stoichiometric quantity of concentrated hydrochloric acid, adding an excess of hydrochloric acid equivalent to about 1.73 times that required for neutralization, and adding the remainder of the isopropyl alcohol.

3. A method of preparing a liquid soldering flux containing ammonium chloride, urea, monoethanol amine and hydrochloric acid in solution in a major proportion of a volatile alcohol and a minor proportion of water in which the water content is not in excess of 20% by weight of the finished flux comprising, blending the nitrogen containing ingredients, adding from about ⅙ to ⅓ of the alcohol, acidifying the nitrogen containing ingredients with an excess of concentrated hydrochloric acid and adding the remainder of the volatile alcohol to form a solution of the ingredients.

4. A flux composition for use in soldering tin-free ferrous surfaces consisting of about from 50 to 200 grams of ammonium chloride, about from 200 to 2500 grams of a member of the group consisting of urea and the hydrochloride salt thereof, about from 100 to 2500 grams of a member of the group consisting of monoethanol amine and the hydrochloride salt thereof, about from 500 to 800 ml. of concentrated hydrochloride acid, about from 0 to 150 ml. of water and sufficient volatile alcohol to make one gallon of flux.

References Cited in the file of this patent

UNITED STATES PATENTS

| Number | Name | Date |
| --- | --- | --- |
| 1,748,180 | Lawhon | Feb. 25, 1930 |
| 1,785,134 | McQuaid | Dec. 16, 1930 |
| 1,785,155 | Taylor | Dec. 16, 1930 |
| 1,882,734 | Barber | Oct. 18, 1932 |
| 1,949,916 | McQuaid | Mar. 6, 1934 |
| 2,659,684 | Neish | Nov. 17, 1953 |